(12) United States Patent
Iino et al.

(10) Patent No.: US 6,359,369 B1
(45) Date of Patent: Mar. 19, 2002

(54) ULTRASONIC MOTOR AND ELECTRONIC APPLIANCE HAVING SAME

(75) Inventors: Akihiro Iino; Kenji Suzuki; Masao Kasuga, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/535,374

(22) Filed: Mar. 24, 2000

(30) Foreign Application Priority Data

Mar. 25, 1999 (JP) .............................. 11-082111

(51) Int. Cl.⁷ .................................................. H02N 2/00
(52) U.S. Cl. ........................................ 310/323; 310/317
(58) Field of Search ............................... 310/317, 323.4

(56) References Cited

U.S. PATENT DOCUMENTS

| | | | | |
|---|---|---|---|---|
| 4,882,500 A | * | 11/1989 | Ijiam | 310/323.02 |
| 5,821,667 A | * | 10/1998 | Takagi | 310/317 |
| 6,242,846 B1 | * | 2/1999 | Ashizawa | 310/317 |
| 6,252,333 B1 | * | 2/1999 | Iino | 310/323.02 |
| 6,218,769 B1 | * | 8/1999 | Iino | 310/323.02 |
| 6,104,124 A | * | 8/2000 | Suzuki | 310/328 |
| 6,211,603 B1 | * | 4/2001 | Iion | 310/323.02 |
| 6,252,332 B1 | * | 6/2001 | Takagi | 310/317 |

FOREIGN PATENT DOCUMENTS

| | | |
|---|---|---|
| EP | 0395298 | 10/1990 |
| JP | 07030168 | 1/1995 |
| JP | 7241090 | 9/1995 |
| JP | 8285112 | 11/1996 |
| JP | 9065674 | 3/1997 |
| JP | 09181372 | 7/1997 |

* cited by examiner

Primary Examiner—Nestor Ramirez
Assistant Examiner—Karen Addison
(74) Attorney, Agent, or Firm—Adams & Wilks

(57) ABSTRACT

An ultrasonic motor is provided that is improved in reliability of a self-oscillator circuit constituted by the ultrasonic motor itself and high in efficiency. In a case of driving with one standing wave, the resonant point of a vibration mode used for driving is made lower than a resonant point of another vibration mode that is same in form as this vibration mode but different in node position. Furthermore, oscillation is caused between two resonant points. Where using two standing waves, oscillation is caused at a higher frequency than any of the two resonant points.

23 Claims, 15 Drawing Sheets

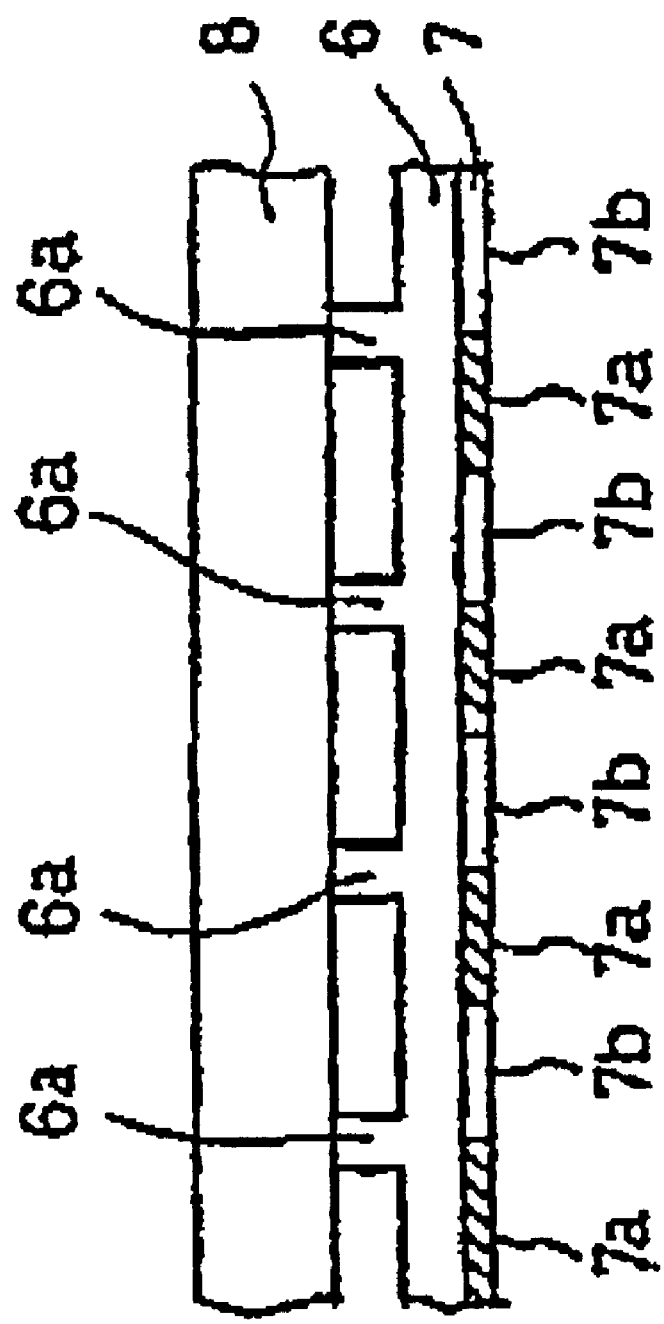

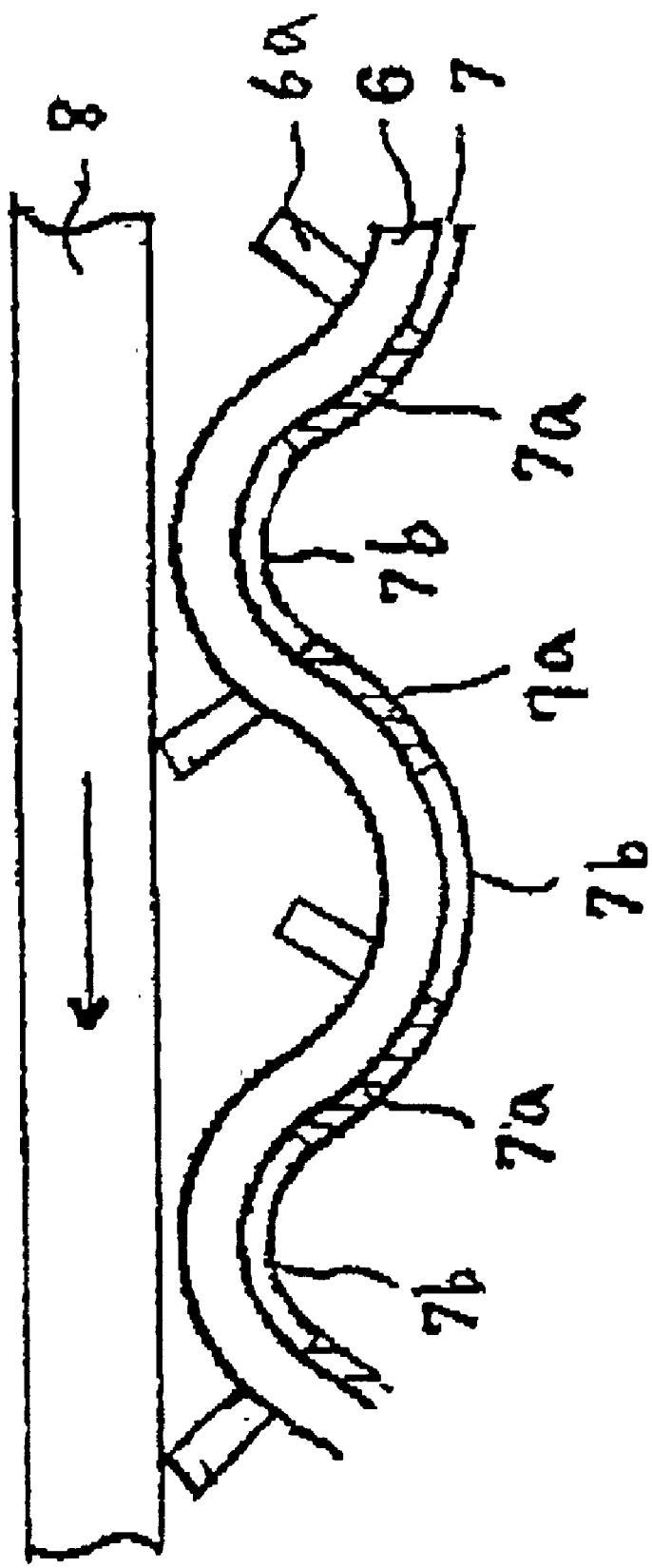

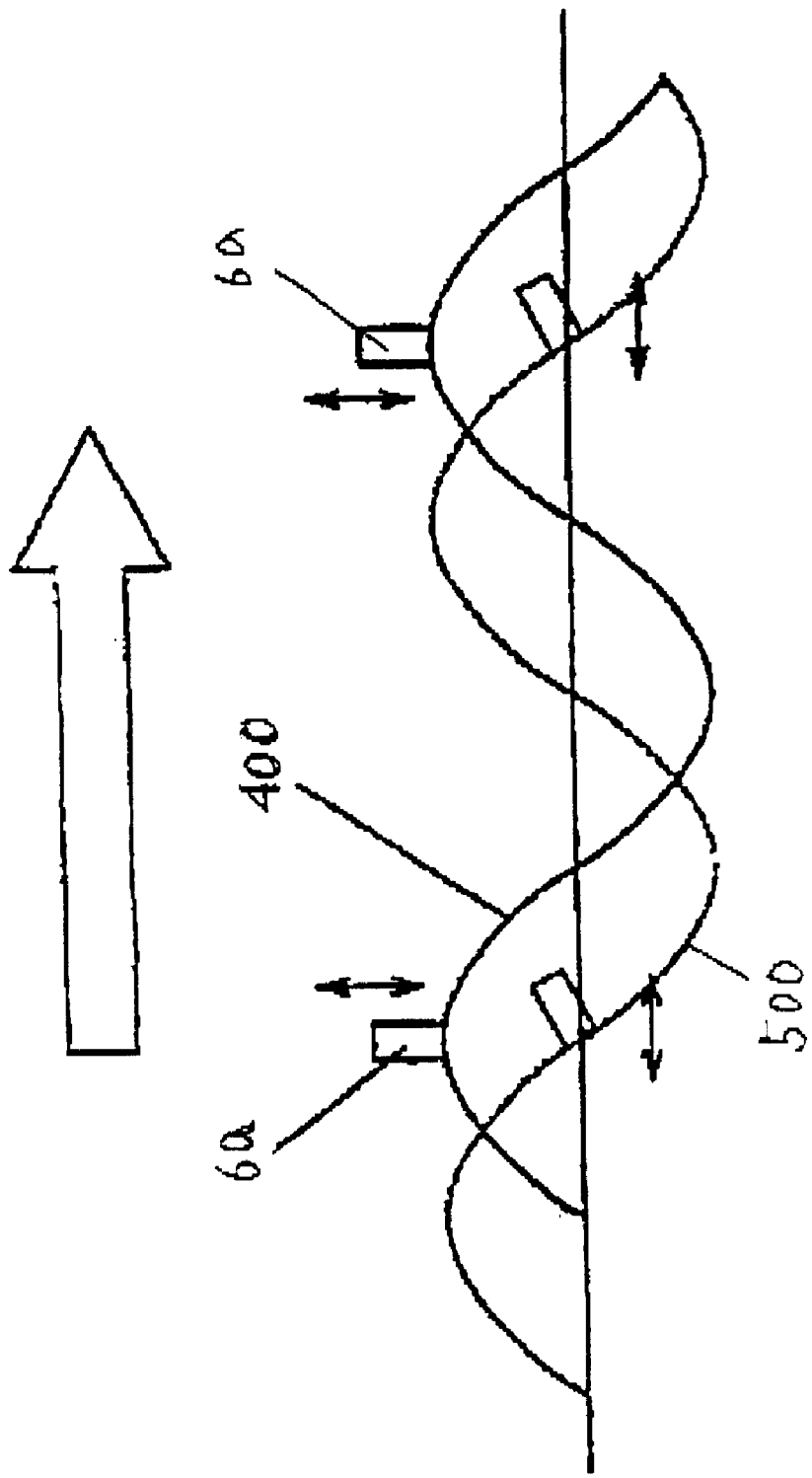

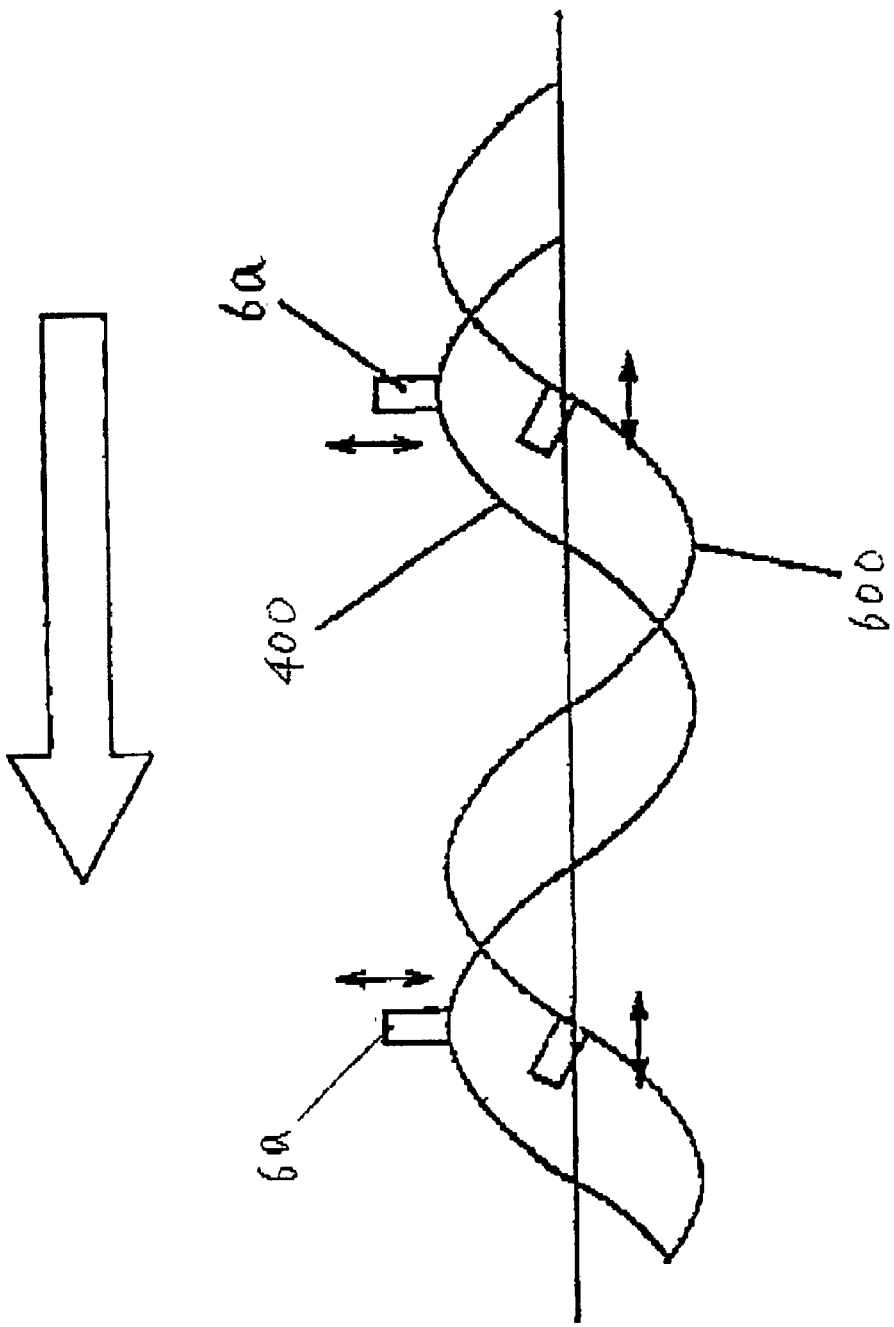

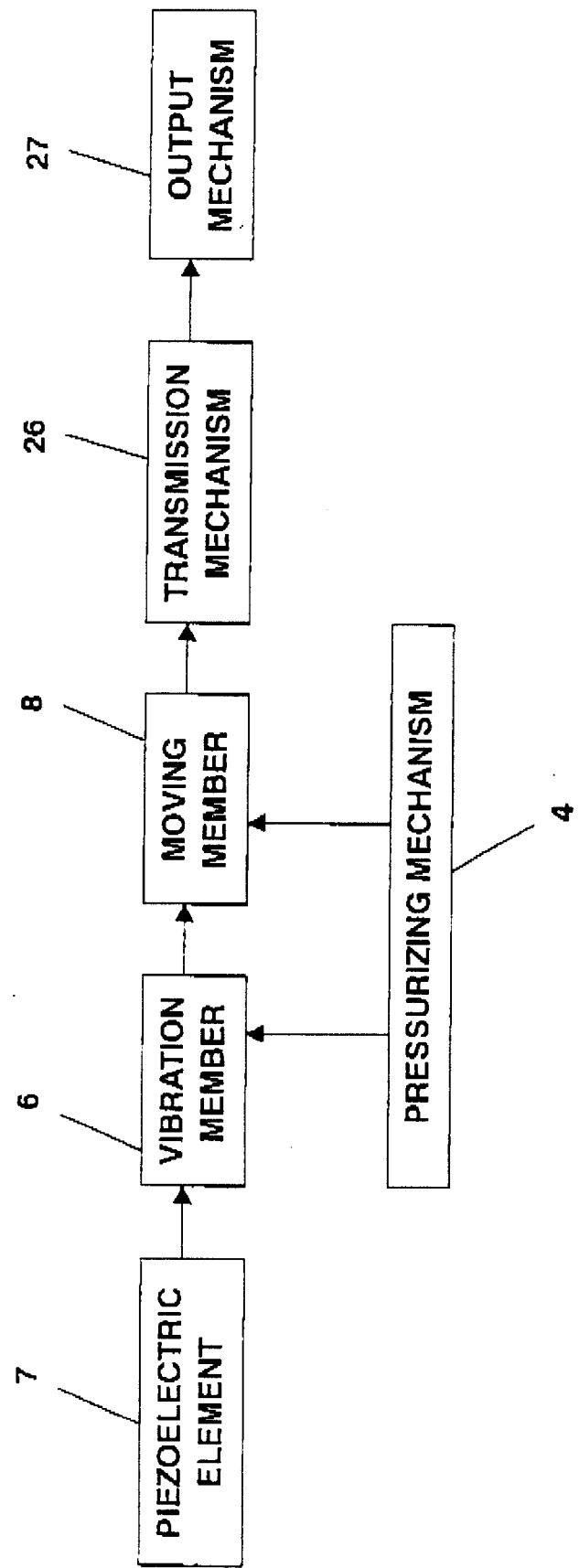

ULTRASONIC MOTOR AND ELECTRONIC APPLIANCE HAVING SAME

BACKGROUND OF THE INVENTION

1. Field of the Invention

The present invention relates generally to an ultrasonic motor having a vibrator having a piezoelectric element to vibrate for frictionally driving a moving member, and to an electronic appliance using such an ultrasonic motor. More particularly, the invention relates to an ultrasonic motor to be driven through self-oscillation by utilizing the ultrasonic motor as a vibrator.

2. Description of the Prior Art

In recent years, attention has been drawn to ultrasonic motors for use as actuators based on a new principle in various electronic appliances. Such applications have included a camera auto-focus drive and other various fields. The ultrasonic motor generally adopts a separately excited drive scheme in which a frequency signal created by an external oscillator circuit is applied to a piezoelectric element to cause an oscillation mode on a vibrator having the piezoelectric element. However, the separately excited drive scheme has the defect of being a complicated circuit configuration. In place of the separately excited drive scheme, a self-oscillation drive scheme has been tried and placed into practical use wherein an ultrasonic motor is utilized as a vibrator to cause oscillation due to resonance of the vibrator. The utilization of such a circuit contributes to size reduction and simplification of the circuit and ultimately to reducing the size and cost for an apparatus on which a drive circuit is to be mounted.

However, the self-oscillation drive scheme often undergoes unstable oscillation despite its feature of circuit size reduction and simplification through use of a reduced number of components. The self-oscillator circuit structurally utilizes the resonance of a vibrator as a mechanical filter, thereby amplifying only a particular frequency of signals for sustaining oscillation. However, the vibrator has a plurality of natural oscillation frequencies existing thereon. This might result in a fear of abnormal oscillation in which oscillation occurs at a resonant point including a different vibration mode from a target vibration mode. Such abnormal oscillation is likely to occur where other vibration modes are present in the vicinity of the target vibration mode. Meanwhile, the performance of an ultrasonic motor, such as rotation speed and torque, is largely dependent upon the drive frequency. For the self-oscillation drive scheme, the frequency is given by oscillation caused due to the vibrator and circuit with circuit elements. This results in the possibility that the frequency will be changed and hence change motor performance. Particularly where self-oscillation driving is caused by utilizing a plurality of different vibration modes, the overall or overlapped resonant characteristic is complicated and likely to cause oscillation frequency change and hence abnormal oscillation because of a different resonant frequency and characteristic between the different resonant frequency and characteristic between the different vibration modes.

SUMMARY OF THE INVENTION

The present invention is used to drive an ultrasonic motor by a self-oscillation drive circuit. In securing oscillation stability, self-oscillation is caused using a frequency range in which any one only is operable of a plurality of resonant points. For example, where an unwanted resonant point exists in the vicinity of a target resonant point, the unwanted resonant point is raised higher than a resonant point possessed by a vibration mode to be used to operate the ultrasonic motor. Due to this, the effect of an unwanted vibration mode is suppressed as much as possible. Furthermore, self-oscillation is caused using a frequency range where phase change occurs only at the target resonant point. Particularly where a second resonant point exists between a first resonant point and an anti-resonant point thereof, resonance is caused between the first resonant point and the second resonant point. Meanwhile, where the ultrasonic motor is driven using a plurality of different resonant points, self-oscillation driving is made at a higher frequency than any of these resonant points.

BRIEF DESCRIPTION OF THE DRAWINGS

FIGS. 3A to 3D are figures showing a driving principle of the ultrasonic motor of the invention;

FIGS. 6A to 6C are figures showing another driving principle of the ultrasonic motor of the invention;

FIG. 10 is a block diagram showing an example that the ultrasonic motor of the invention is applied to an electronic appliance.

DETAILED DESCRIPTION OF THE REFERRED EMBODIMENT

Embodiments to which the present invention is applied will be described in detail with reference to FIG. 1 to FIG. 9.

Figure 1:
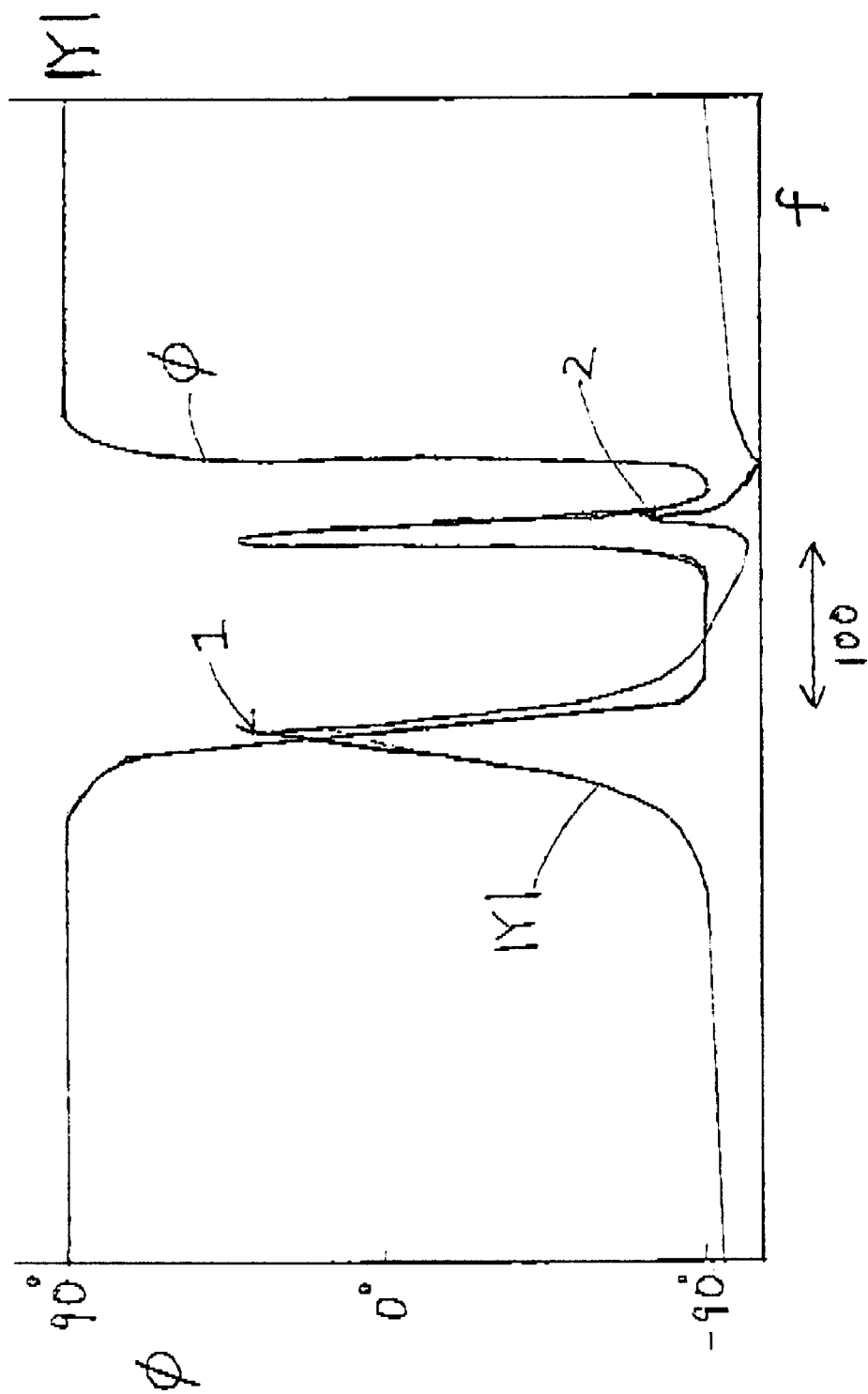
FIG. 1 is a figure showing a frequency vs. admittance characteristic of a vibrator of an ultrasonic motor of the present invention.

Referring to FIG. 1, a frequency vs. admittance characteristic is shown to explain the oscillation frequency of an ultrasonic motor to which the invention is applied.

Figure 2:
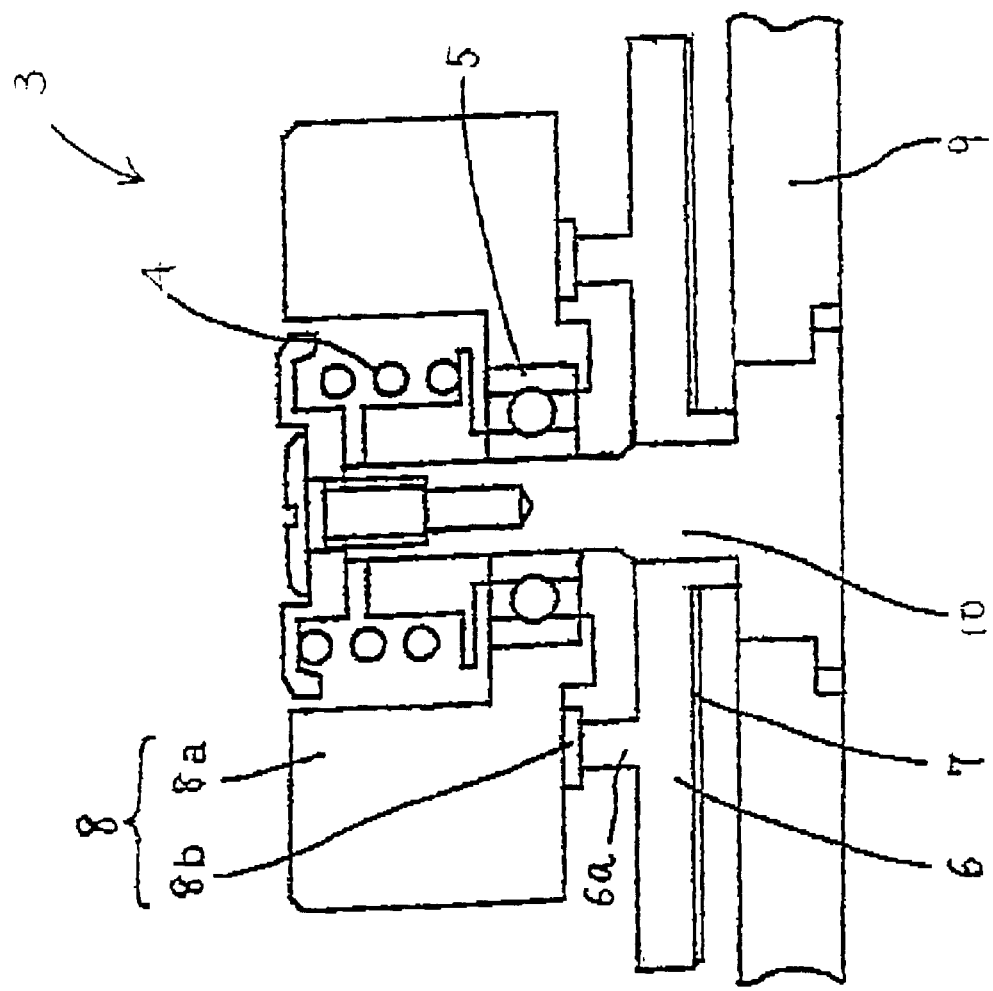
FIG. 2 is a sectional view showing a structure of an ultrasonic motor of the invention.

FIG. 2 depicts a structure of the ultrasonic motor 3 as an embodiment of the invention, while FIG. 3 illustrates an operating principle of the ultrasonic motor 3. First explained is an operating principle of a ultrasonic motor according to the invention. In FIG. 2, a vibrator 6 in a disk form is supported on a center shaft 10 having a center fixed by a support plate 9. The vibrator 6 has a first surface bonded with a piezoelectric element 7 and a second surface provided with protrusions 6a to magnify vibration displacement of the vibrator 6 and give a rotational force to a moving member 8. The moving member 8 has at a center a bearing 5 having a center guided by the center shaft 10. The bearing 5 has an inner race pressurized by a spring member 4 to provide a contact pressure between the protrusions 6a of the vibrator 6 and a friction member 8b of the moving member 8.

Vibration waves caused on the vibrator 6 due to a piezoelectric effect of the piezoelectric element 7 are converted into a rotational force to the moving member 8 through a friction force.

FIGS. 3A to 3D shows a detailed operating principle. The piezoelectric element 7 bonded on the vibrator 6 is circumferentially divided by a quarter wavelength so that polarization can be made in alternate directions. Electrode patterns are alternately electrically shorted to constitute two groups of electrode patterns respective ones of which are shown by hatched areas 12a and non-hatched areas 12b. The vibrator and the piezoelectric element are bonded together such that the protrusions 6a of the vibrator 6 position just on respective boundaries of an electrode pattern. An electrode 12c is provided entirely on the bonding surface.

Figure 3A:
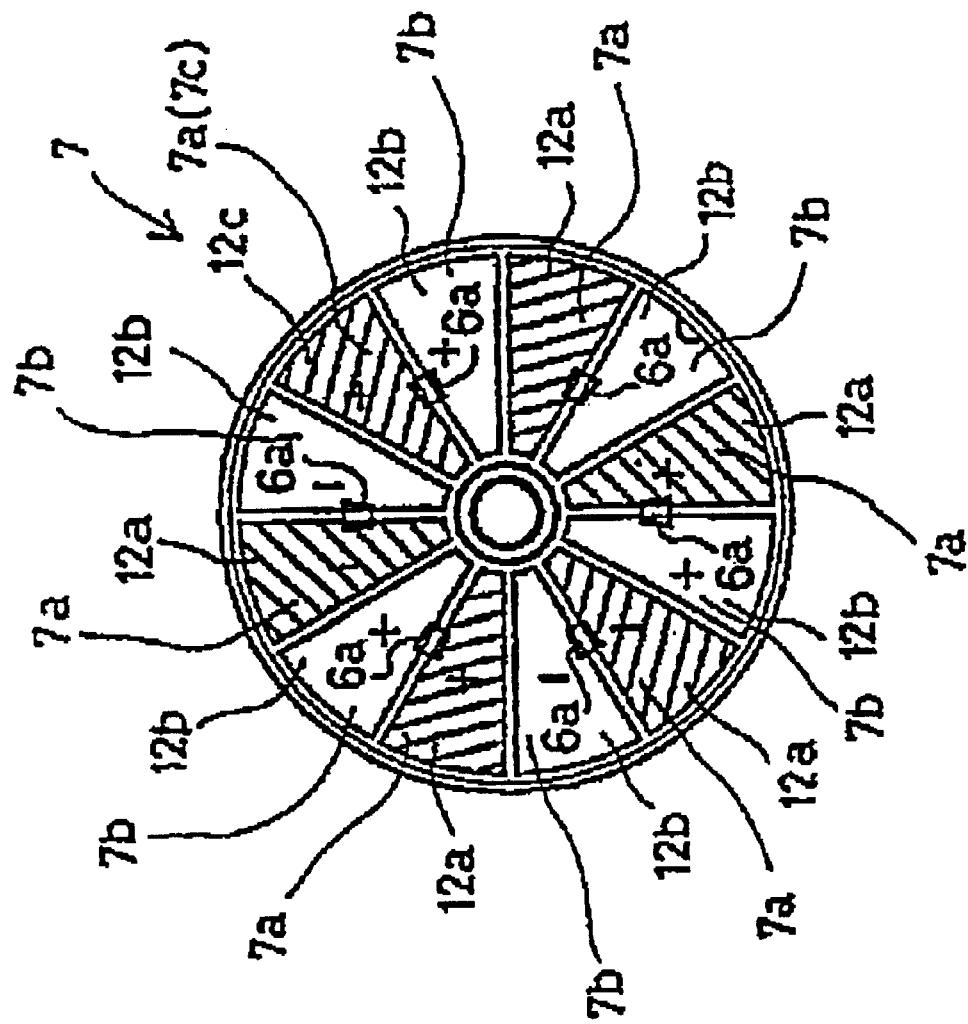
Figure 3C:
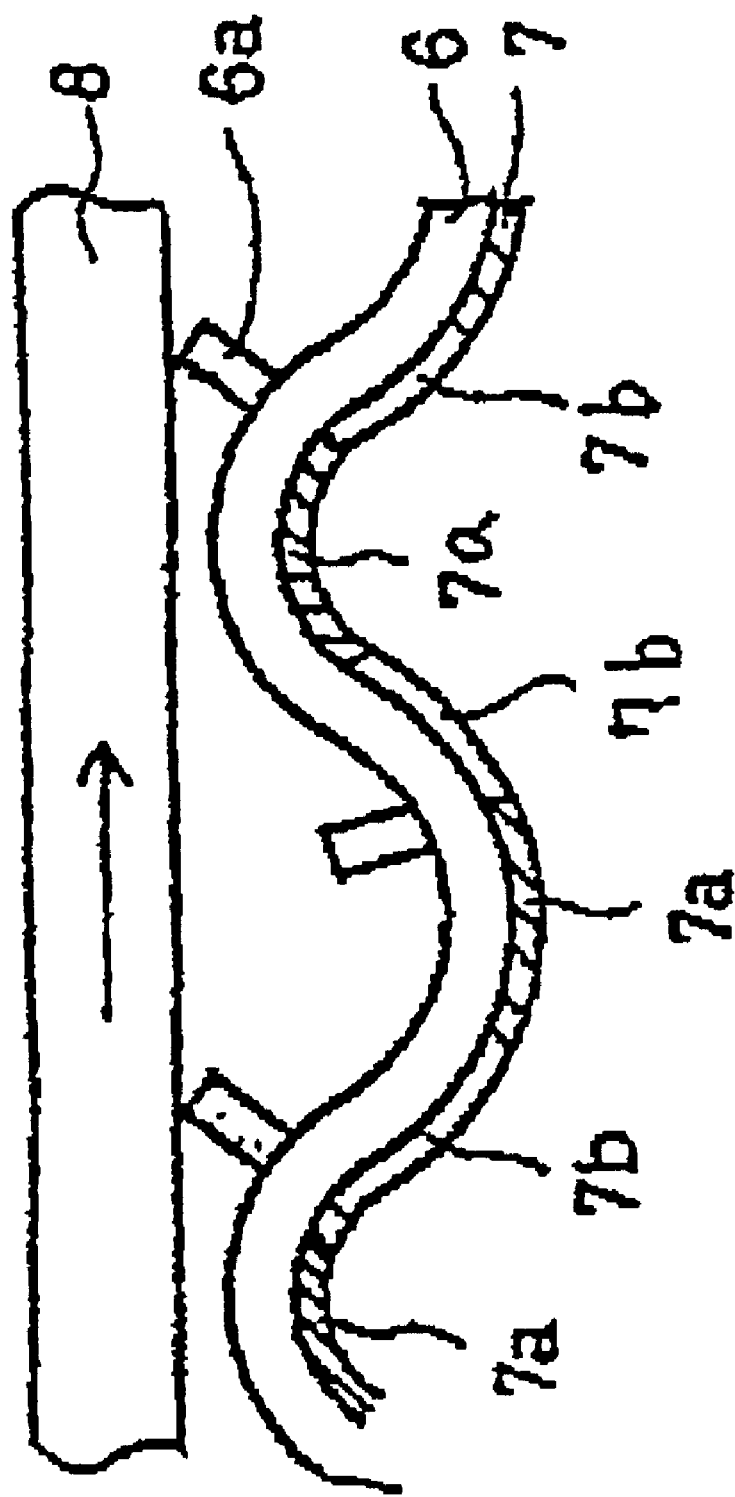

When a signal with a predetermined frequency is applied to the pattern group 12a, a standing wave is caused on the vibrator 6 as shown in FIG. 3C. Thereupon, the projections 6a raised incline to right to cause the moving member 8 in contact therewith to move rightward. The application of a signal to the non-hatched pattern group 12b causes a standing wave as shown in FIG. 3D, moving the moving member leftward this time.

The use of the piezoelectric element 7 of the present embodiment causes a standing wave having circumferentially three waves. Because the number of radial nodes differs depending on a frequency, the projections 6a are preferably provided at points where the amplitude is maximum with respect to a radial direction in an oscillated vibration mode.

Figure 4:
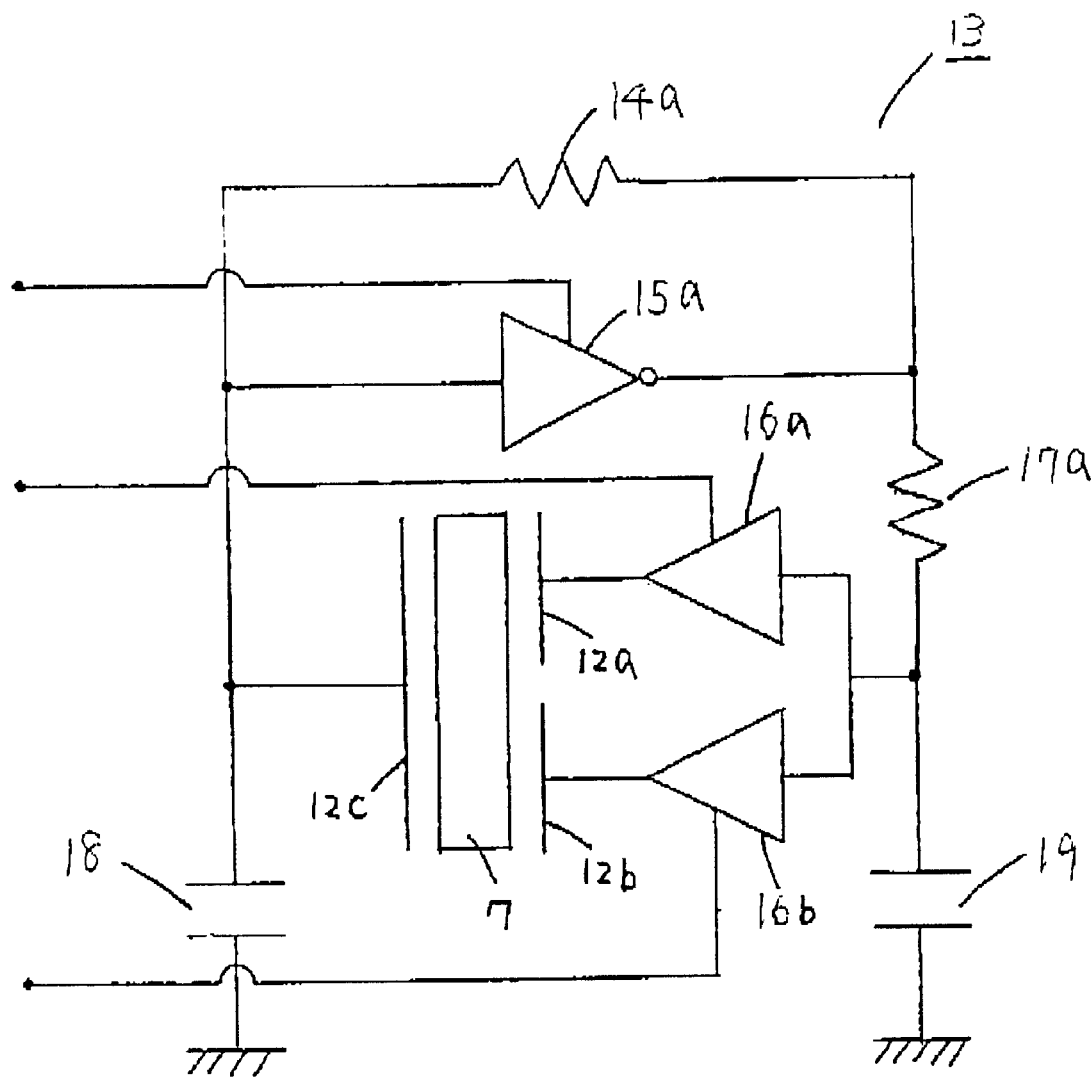
FIG. 4 is a figure showing an example of a drive circuit of the ultrasonic motor of the invention.

FIG. 4 shows a drive circuit 13 to the ultrasonic motor using a Colpitts self-oscillator circuit. The Colpitts oscillating circuit constitutes an oscillator circuit making utilization of the fact that the piezoelectric element 7 is inductive at points between a resonant point and a non-resonant point.

Two buffers 16a and 16b are respectively connected to the two electrode pattern groups 12a and 12b of the piezoelectric element 7 in an independent fashion. The vibrator 6 bonded with the piezoelectric element 7 and the two capacitors 18 and 19 cooperatively form a resonator circuit. An inverter 15a and resistance 14a form an inversion amplifier circuit to invert and amplify a signal form the resonator circuit and sends it back to the resonator circuit, thereby sustaining oscillation.

Here, the inverter 15a and the two buffers 16a and 16b are in a tri-state configuration which can provide a high impedance state, i.e. off output signal, on an output terminal depending on a signal input to a control terminal.

For example, turning off an output signal of any one buffer 16a or 16b enables switching rotation of between normal and reverse. Stopping is performed by turning off an output signal o the inverter 15a or two buffers 16a and 16b (high impedance on the output terminal).

In the meanwhile, as shown above the ultrasonic motor of the invention is driven by one standing wave. It is often a case that, in a vicinity of a resonant mode contributing to driving, other vibration modes occur that give no contribution to driving regardless of a magnitude of an oscillation force. This in may cases is due to a vibration mode having a same form as a vibration mode contributing to driving but different in node position with respect to the circumferential direction.

For example, if a drive signal is applied to the electrode pattern group 12a to cause a vibration mode as in FIG. 3C, there is often a case that a vibration mode be caused as in FIG. 3D wherein in a vicinity of a resonant point a resonant point be caused orthogonal to that vibration mode (with phase deviation by 90 degrees in position). This unwanted vibration mode varies in magnitude and frequency depending on a vibration mode used, electrode pattern on the piezoelectric element 7, shape of the vibrator, and so on. Particularly for a vibrator shape as in the present embodiment, the magnitude and resonant frequency of unwanted vibration is greatly affected by the shape of vibrator disk and protrusions 6a. If the bending moment at the protrusion 6a has a natural oscillation frequency approaching a natural oscillation frequency of target vibration, the unwanted vibration mode increases. Accordingly, the protrusions 6a must be set in height and width with attention paid to those factors. By optimizing these design parameters, the resonant point for such a unwanted vibration mode is increased higher than a resonant point of a target vibration mode. For example, as shown in FIG. 3 the electrode pattern on the piezoelectric element 7 is optimized to reduce an oscillation force of an unwanted vibration mode, i.e. admittance and electromechanical coupling coefficient, smaller than those of the target vibration mode. This suppresses the amplitude of an unwanted vibration mode and facilitates self-oscillation in a target mode. Also, adjustment is made on values of the elements forming the filter, such as capacitors 18 and 19 and resistance 17a, in order for causing oscillation at between a resonant point of a target vibration mode and a resonant point of an unwanted vibration mode, thereby setting an oscillation frequency to stably oscillate at the target vibration mode.

At a higher frequency than a resonant point as a boundary, the mechanical amplitude of vibrator 6 gradually decreases. At a lower frequency than the resonant point, it greatly decreases and the effect of vibration mode becomes extremely small. Particular also from a hysteresis characteristic unique to piezoelectric elements, the mechanical amplitude decrease is abrupt at a lower frequency than the resonant point. Accordingly, by optimizing structural design parameters for the ultrasonic motor 3 as shown above, as shown in FIG. 1 a second resonant point where an unwanted vibration mode will occur is made higher than a first resonant point where a target vibration mode is to be caused. Furthermore, by optimizing a circuit constant, a self-oscillation is caused at between the resonant point for causing a target vibration mode and the second resonant point for an unwanted vibration mode and the second resonant point for an unwanted vibration mode, particularly in a region 100 where the phase is greatly inverted. This provides stable oscillation and realizes an ultrasonic motor which is extremely low in the effect of an unwanted mode and stable in operation and high in efficiency.

Figure 5:
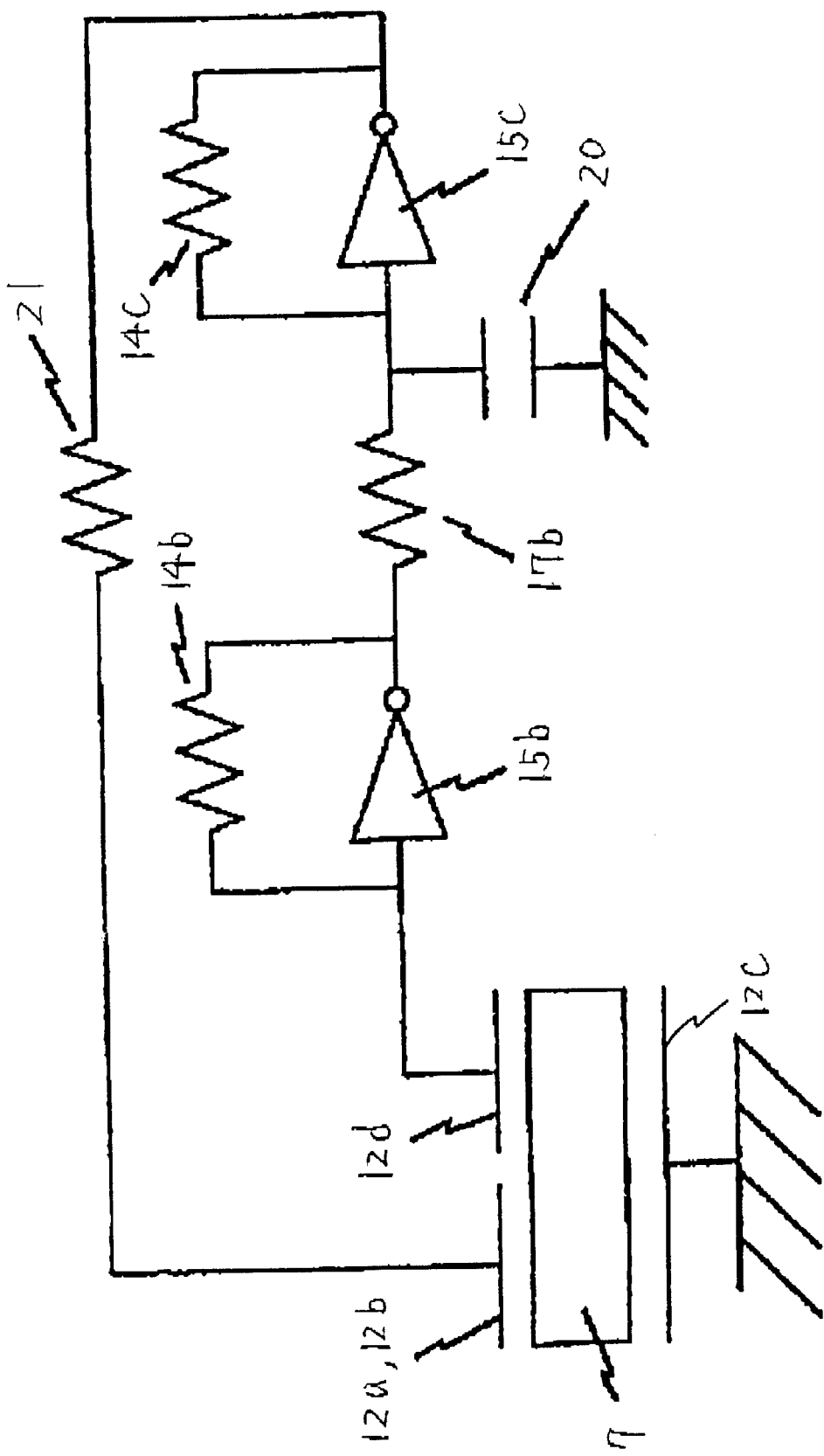
FIG. 5 is a figure showing another example of a drive circuit of the ultrasonic motor of the invention.

The explanation was herein made on the example utilizing the Colpitts oscillator circuit as a self-oscillator circuit. Alternatively, a vibration feed-back type oscillator circuit may be used as shown in FIG. 5 wherein a detection electrode 12d is provided separately from the drive electrode 12a or 12b to feed back a detection signal to the drive electrode 12a or 12b through amplifier circuits 14b, 15b and 14c, 15c thereby sustaining oscillation. Also, the ultrasonic motor 3 is not limited in structure or driving principle to the one shown herein. That is, the invention is applicable for a case that a resonant point not contributing to driving exists in the vicinity of a resonant point having a resonant mode contributing to driving the ultrasonic motor 3.

In resonance, self-oscillation is easy to occur where admittance and electromechanical coupling coefficient are both high. Particularly where admittance is high, a large detection signal is obtained from a detection electrode 12d in a self-oscillator circuit of a vibration feed-back type as shown in FIG. 5, facilitating oscillation. Meanwhile, where electromechanical coupling coefficient is high, it is possible to obtain a wide frequency range 100 in which the piezoelectric element 7 is inductive thus facilitating oscillation in a Colpitts self-oscillator circuit as shown in FIG. 4 and enabling oscillation over a wide frequency range.

Figure 6A:
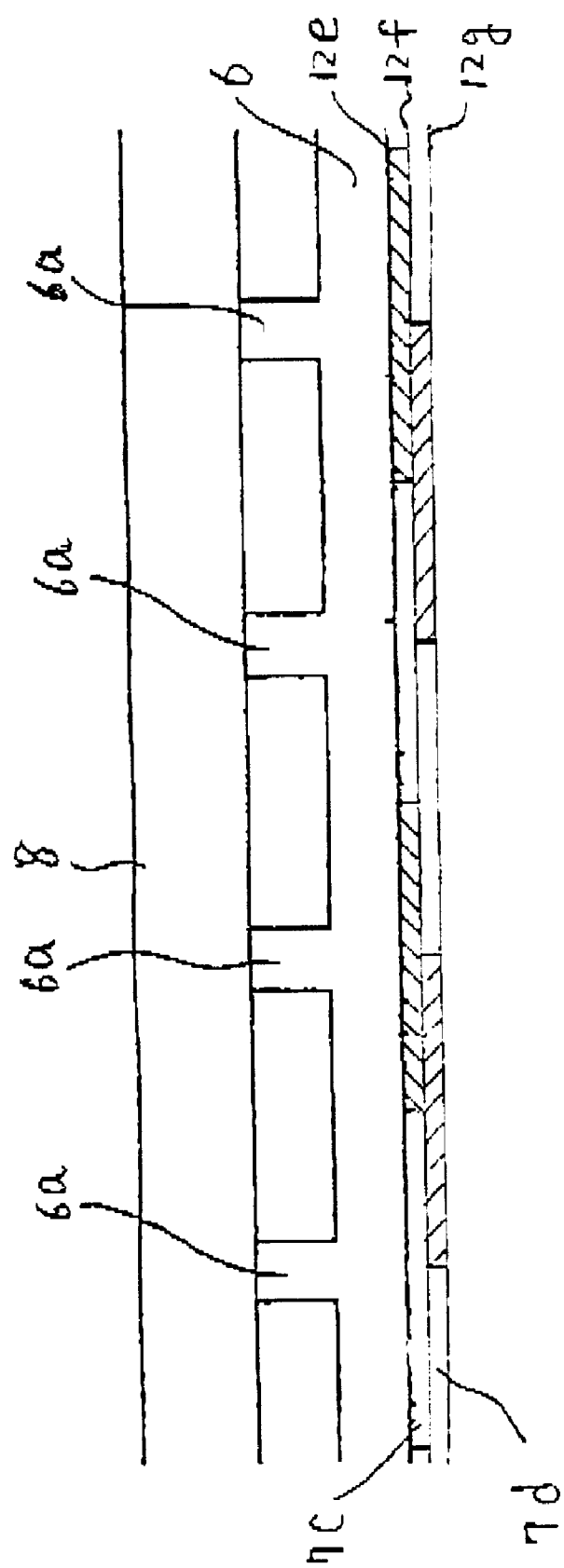

FIGS. 6A to 6C shows a driving principle of an ultrasonic motor of another embodiment according to the invention. This ultrasonic motor is basically the same in basic structure as that of the one shown in Embodiment 1 described before. Two piezoelectric elements 7c and 7d herein are bonded together as shown in FIG. 6A which are different in polarization direction at an interval for example of a half wavelength. In one element, the hatched part and the non-hatched part are opposite in polarization direction with respect to a thickness direction. That is, bonding is made such that the protrusions 6a are positioned at a center of each polarization region for one piezoelectric element 7c and at on a boundary of adjacent polarization regions for the other piezoelectric element 7d. Herein, the application of a voltage signal with a predetermined frequency to the piezoelectric element 7c causes a vibration mode 400 to vertically vibrate the protrusions 6a. If a voltage signal with a predetermined frequency is applied to the piezoelectric element 7d, a vibration mode 500 is caused to vibrate the protrusions left and right. Consequently, if the piezoelectric elements 7c and 7d are applied with respective voltage signals, two vibration components 400, 500 are combined to move the moving member 8 rightward as shown by the arrow in FIG. 6B. Next, the piezoelectric elements 7c and 7d are applied with voltage signals different in phase for example by 180 degrees, two vibration components 400 and 600 are combined thereby moving the moving member leftward as shown by the arrow in FIG. 6C.

Figure 7:
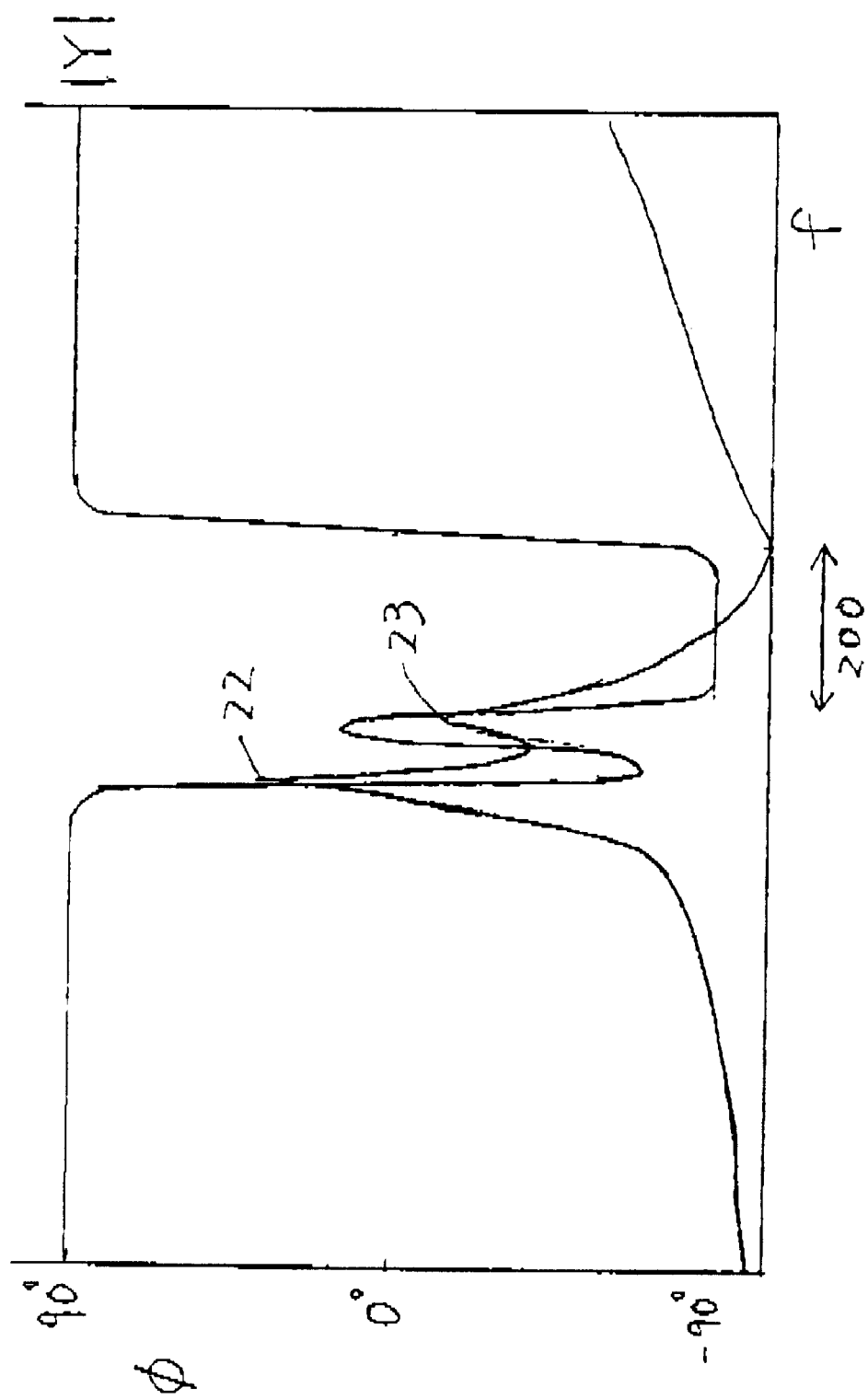
FIG. 7 is a figure showing another example of a frequency vs. admittance characteristic of a vibrator of an ultrasonic motor of the invention.

In the case that two vibration modes are utilized to structure a motor in this manner, a difference occurs that is not a little difference between the two vibration resonant frequencies. The resonant frequency varies depending on a shape of the vibrator 6, an electrode pattern on the piezoelectric element 7 and the like. In the case that the ultrasonic motor is driven by self-oscillation in this manner, these design parameters are optimized to bring these two resonant points 22 and 23 as close as possible as shown in FIG. 7. Furthermore, the circuit constant of a self-oscillator circuit is adjusted for self-oscillation at a higher frequency than the two resonant points 22 and 23.

Although the ultrasonic motor shown in the present embodiment utilizes two vibration components, displacement abruptly decreases at a lower frequency than the resonant point as was shown in Embodiment 1 described before.

Figure 8:
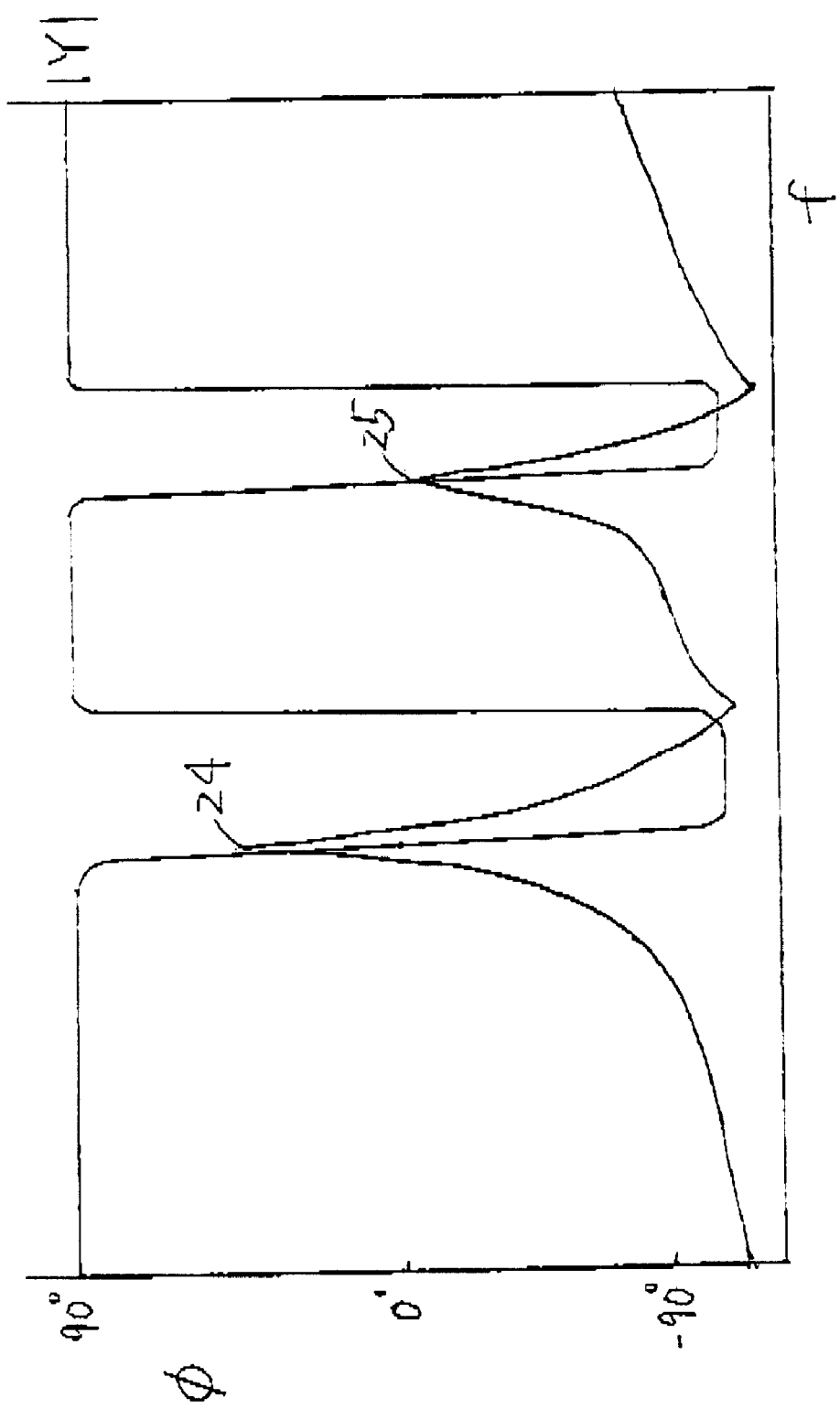
FIG. 8 is a figure showing a frequency vs. admittance characteristic of a vibrator for explaining an effect of the ultrasonic motor of the present.

Meanwhile, hysteresis occurs in the vicinity of the resonant point. Accordingly, self-oscillation if caused at a higher frequency than the two resonant points 22 and 23 makes possible to effectively utilize two vibration modes and hence realize a ultrasonic motor high in efficiency, stable in oscillation and high in reliability. The oscillator circuit requires a large circuit loop gain and phase rotation being in a multiple of 360 degrees. As shown in FIG. 7 by reducing a frequency difference between the two vibration resonant points 22 and 23 smaller than a frequency difference between a higher resonant point 23 and an anti-resonant point thereof, the region 200 where phase greatly changes (about 180 degrees) broadens. This enables stable self-oscillation, widens a variable range of oscillation frequency and facilitating to adjust or change motor characteristics such as rotation speed. This is particularly effective for the case of utilizing a Colpitts oscillator circuit as was shown in FIG. 4, because the electric characteristic of piezoelectric element 7 becomes inductive and oscillation frequency has a difference 200 between a resonant point that phase changes by 180 degrees and an anti-resonant point. FIG. 8 shows an admittance characteristic for a case that two resonant points are conversely distant. In this manner two of resonance are separated and a phase-inverting region is completely separated into two. Accordingly, particularly where utilizing a Colpitts oscillator circuit, if oscillation is caused at a lower one of the resonant frequencies, any one of the vibration mode can only be utilized thus reducing the efficiency of the ultrasonic motor 3.

Figure 9:
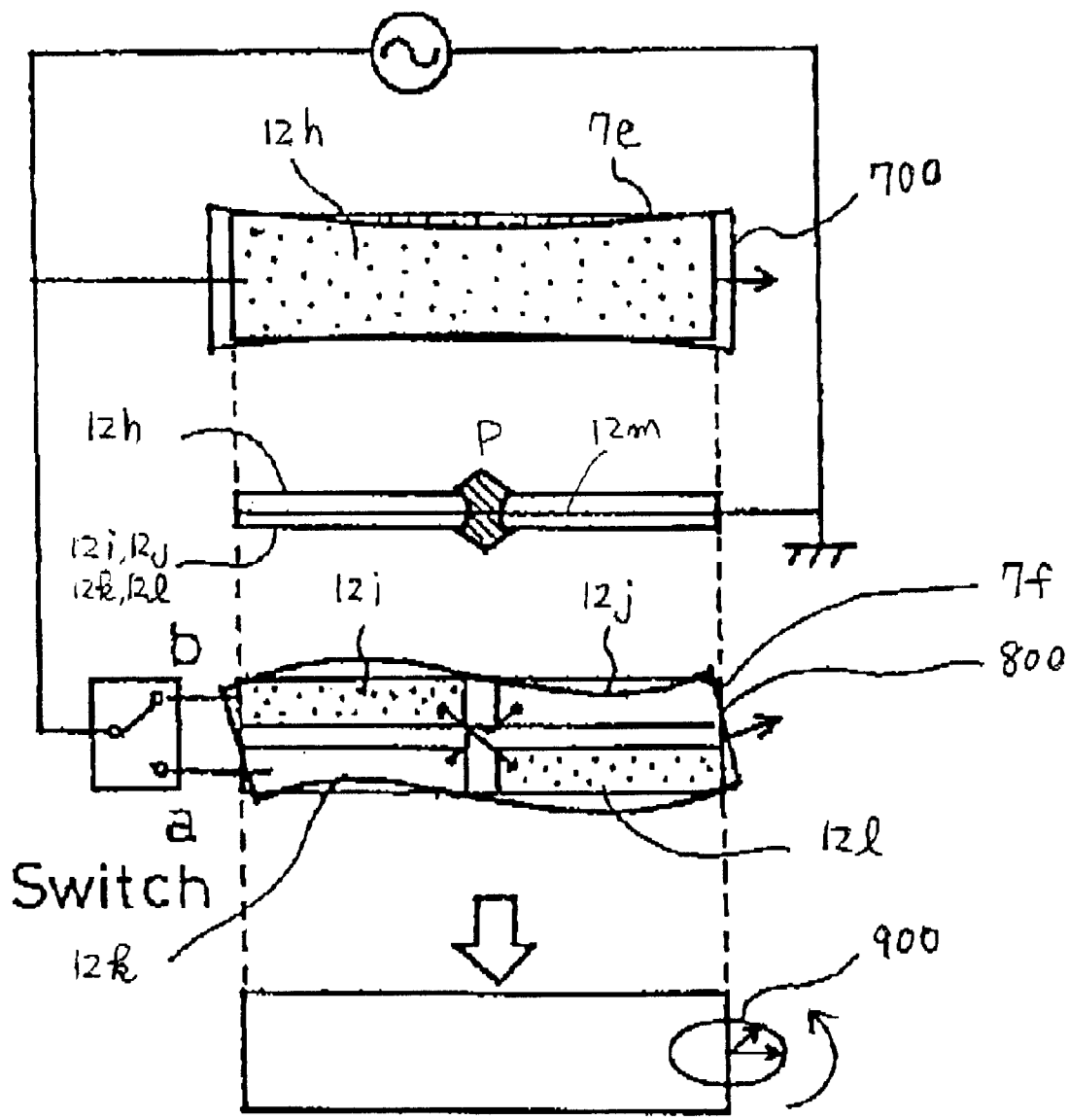
FIG. 9 is a figure showing a driving principle in a case that a rectangular plate vibrator is used in the ultrasonic motor of the invention.

The example using the piezoelectric element structure as in FIG. 6 was herein shown on the case of using the two vibration modes. However,the invention is not limited to this. Further, the motor structure is not limited to this. For example, it is also possible to use one as shown in FIG. 9 utilizing a resultant vibration 900 of expansion vibration 700 and bending vibration 800 on a rectangular plate. Herein, a drive signal is applied to a piezoelectric element 7e polarized in a same thickness direction P throughout a surface and having an electrode 12h over the entire surface thereof to provide expansion vibration 700. Further, a piezoelectric element 7f having four-divided electrodes 12i, 12j, 12k and 12l on at least one surface and polarized in a same thickness direction throughout a surface so that a signal can be applied only to the diagonally-positioned electrodes 12i, 12l or 12j, 12k to principally cause bending vibration 800.

Furthermore, in a case of using vibration 400 and 700 having displacement in a contact pressure direction of the moving member 8 and vibrator 6 as were shown in the above two examples, a resonant point of that vibration is positioned at the resonant point 23 higher in frequency of the two resonant points 22 and 23 of FIG. 7. This makes it possible to produce a reacting force against an application force by the moving member 8, generating a large torque.

FIG. 10 shows a block diagram of Embodiment 3 wherein the ultrasonic motor of the invention is applied to an electronic appliance.

The present electronic appliance is characterized by having a vibrator 6 as described before, a moving member 8 to be driven by the vibrator 6, pressurizing means 4 for applying a contact pressure to the moving member 8 and vibrator 6, a transmission mechanism 26 for interacting with and moving the moving member 8, and an output mechanism 27 to move based on the movement of transmission mechanism 26.

The transmission mechanism 26 herein uses, for example, a transmission wheel, such as a gear or friction wheel. A direct output mechanism may be provided with the transmission mechanism 26 omitted. The output mechanism 27 uses, for example, for a indicator device or electronic timepiece a pointer, a pointer drive mechanism, display board such as of a calendar, or a display board drive mechanism, for a copier or printer a mirror for changing laser direction, for a camera or video camera a shutter drive mechanism, an aperture drive mechanism, a lens drive mechanism, a film winding mechanism or the like, for a measuring instrument or manufacture equipment or sensor utilizing laser or light a slit sheet or filter to shade, transmit light or pass a particular wavelength of light, for an acoustic device volume control or the like a contact mechanism or gap plate to vary a resistance or capacitance value, and for a hard disk or optical disk a pick-up drive mechanism.

Meanwhile, if an output shaft is mounted on the moving member 8 to provide a structure having a power transmission mechanism to transmit torque through the output shaft, a drive mechanism can be realized by the ultrasonic motor itself.

As discussed above, the use of the ultrasonic motor for a drive source of an electronic appliance makes possible reduction of apparatus size and power consumption, improvement of responsibility and positioning dissolving power, and use in a magnetic field or vacuum.

Furthermore, the use of a self-oscillation driving as in the invention would achieve drive-circuit size reduction and ultimately apparatus overall size reduction and cost reduction. It is possible to realize an ultrasonic motor which stably causes self-oscillation without occurrence of abnormal oscillation, and further an ultrasonic motor which improves reliability of an appliance mounting with the ultrasonic motor but is less in characteristic change. Furthermore, realized are an ultrasonic motor having high torque, and an electronic appliance to be driven by a ultrasonic motor to which the invention is applied.

What is claimed is:

1. An ultrasonic motor comprising: a vibrator for producing a standing wave; a piezoelectric element for causing the vibrator to undergo vibration at a resonant frequency thereof to produce the standing wave; and a moving member frictionally driven by the vibrator in response to the standing wave; wherein the vibrator has a first vibration mode that contributes to frictional driving of the moving member and a second vibration mode that does not substantially contribute to frictional driving of the moving member in any direction, the second vibration mode has the same form as the first vibration mode but is different in position of a node of the vibrator, and a resonant point of the second vibration mode is higher in frequency than a resonant point of the first vibration mode.

2. An ultrasonic motor according to claim 1; further comprising a self-oscillator circuit having an amplifier circuit for driving the piezoelectric element to produce the standing wave in the vibrator; wherein the self-oscillator circuit performs self-oscillation driving of the vibrator at a frequency between the resonant point of the first vibration mode and the resonant point of the second vibration mode.

3. An ultrasonic motor according to claim 1; wherein an admittance at the resonant point of the first vibration mode is higher than an admittance at the resonant point of the second vibration mode.

4. An ultrasonic motor according to claim 1; wherein an electromechanical coupling coefficient at the resonant point of the first vibration mode is higher than an electromechanical coupling coefficient at the resonant point of the second vibration mode.

5. An ultrasonic motor comprising: a vibrator for producing a standing wave; a piezoelectric element for causing the vibrator to undergo vibration at a resonant frequency thereof to produce the standing wave; and a moving member frictionally driven by the vibrator in response to the standing wave; wherein the moving member is frictionally driven in a desired direction by combining together two different vibration modes of the vibrator, and the vibrator is driven by self-oscillation at a resonant frequency higher than resonant points at which the two vibration modes occur.

6. An ultrasonic motor according to claim 5; wherein a higher frequency one of the resonant points of the first and second vibration modes is used to cause displacement of the moving member in a direction of contact pressure of the moving member and the vibrator.

7. An ultrasonic motor according to claim 5; wherein a difference between resonant frequencies at the resonant points of the first and second vibration modes is smaller than a frequency difference between the resonant point of the first and second vibration modes that is higher in frequency and an anti-resonant point thereof.

8. In an electronic appliance having an output mechanism for producing an output motion, and a motor for driving the output mechanism; wherein the motor comprises the ultrasonic motor according to claim 1 for driving the output mechanism to produce the output motion.

9. In an electronic appliance having an output mechanism for producing an output motion, and a motor for driving the output mechanism; wherein the motor comprises the ultrasonic motor according to claim 5 for driving the output mechanism to produce the output motion.

10. An ultrasonic motor according to claim 1; further comprising a stationary support plate; and a fixed shaft attached to the support plate; wherein the vibrator has a disk shape and has an inner peripheral surface fixed to the shaft.

11. An ultrasonic motor according to claim 10; wherein the moving member has a disk shape and has an inner peripheral surface facing the fixed shaft.

12. An ultrasonic motor according to claim 11; further comprising a bearing rotatably supported by the fixed shaft and the inner peripheral surface of the moving member to allow relative rotation of the moving member with respect to the fixed shaft and the vibrator.

13. An ultrasonic motor according to claim 12; wherein the vibrator has a first surface bonded to the piezoelectric element and a second surface opposite the first surface provided with a plurality of projections for magnifying a displacement of the vibrator, and the moving member is supported by the protrusions.

14. An ultrasonic motor according to claim 13; further comprising a spring for applying a biasing force to urge an inner race of the bearing against the protrusions of the vibrator.

15. An ultrasonic motor according to claim 2; wherein the a self-oscillator circuit comprises a Colpitts oscillator.

16. An ultrasonic motor comprising: a vibrator for undergoing vibration in response to an applied vibratory wave; a piezoelectric element disposed on the vibrator for generating the vibratory wave; a moving member frictionally engaged with the vibrator to undergo movement in response to vibration of the vibrator; and a driving circuit for applying a signal to the piezoelectric element to generate the vibratory wave; wherein the vibrator has a first vibration mode that contributes to movement of the moving member in a desired direction and a second vibration mode that does not substantially contribute to movement of the moving member in the desired direction, and a resonant point of the second vibration mode is higher in frequency than a resonant point of the first vibration mode.

17. An ultrasonic motor according to claim 16; wherein the second vibration mode occurs at a different node of the vibrator than the first vibration mode.

18. An ultrasonic motor according to claim 16; wherein the drive circuit vibrates the vibrator at a frequency between the resonant point of the first vibration mode and the resonant point of the second vibration mode.

19. An ultrasonic motor according to claim 16; wherein an admittance at the resonant point of the first vibration mode is higher than an admittance at the resonant point of the second vibration mode.

20. An ultrasonic motor according to claim 16; wherein an electromechanical coupling coefficient at the resonant point of the first vibration mode is higher than an electromechanical coupling coefficient at the resonant point of the second vibration mode.

21. An ultrasonic motor according to claim 16; wherein the moving member is frictionally driven in response to vibration of the vibrator at a combination of the first vibration mode and a third vibration mode; and the driving circuit comprises a self-oscillation driving circuit for driving the vibrator at a resonant frequency higher than resonant points at which the first and third vibration modes occur.

22. An ultrasonic motor according to claim 21; wherein a higher frequency one of the resonant points of the first and third vibration modes is used to move the moving member in a desired direction.

23. An ultrasonic motor according to claim 21; wherein a difference in frequency between resonant points of the first and second vibration modes is smaller than a difference in frequency between the higher one of the resonant points of the first and second vibration modes and an anti-resonant point thereof.

* * * * *